(12) United States Patent
Formenti

(10) Patent No.: US 6,487,469 B1
(45) Date of Patent: Nov. 26, 2002

(54) SYSTEM AND METHOD FOR INTEGRATING SCHEDULE AND DESIGN ENVIRONMENTS

(75) Inventor: Jose Antonio Vieira Formenti, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/436,668

(22) Filed: Nov. 10, 1999

Related U.S. Application Data

(60) Provisional application No. 60/108,381, filed on Nov. 13, 1998.

(51) Int. Cl.[7] ............................................. G06F 19/00
(52) U.S. Cl. .............................. 700/97; 700/100; 705/11
(58) Field of Search ................................ 700/100–108, 700/83, 97, 98, 110, 109; 705/7, 9, 11; 345/440

(56) References Cited

U.S. PATENT DOCUMENTS 5,767,848 A * 6/1998 Matsuaki et al. ............ 345/331
6,233,493 B1 * 5/2001 Cherneff et al. .............. 700/95
6,236,409 B1 * 10/2001 Hartman ...................... 345/435
6,304,790 B1 * 10/2001 Nakamura et al. ............ 700/97

* cited by examiner

*Primary Examiner*—Leo Picard
*Assistant Examiner*—Kidest Bahta
(74) *Attorney, Agent, or Firm*—April M. Mosby; W. James Brady; Frederick J. Telecky, Jr.

(57) ABSTRACT

A system for project management integration includes a design database having design data stored in a hierarchical manner representable by design hierarchical data. The system further includes a schedule database having scheduling data stored in a hierarchical manner representable by schedule hierarchical data. The system also includes an integration module in communication with the design database and the schedule database, the integration module operable to compare the design hierarchical data and the schedule hierarchical data in response to changes to one of the design or schedule databases, the integration module further operable to change one of the design and schedule databases in response thereto.

27 Claims, 4 Drawing Sheets

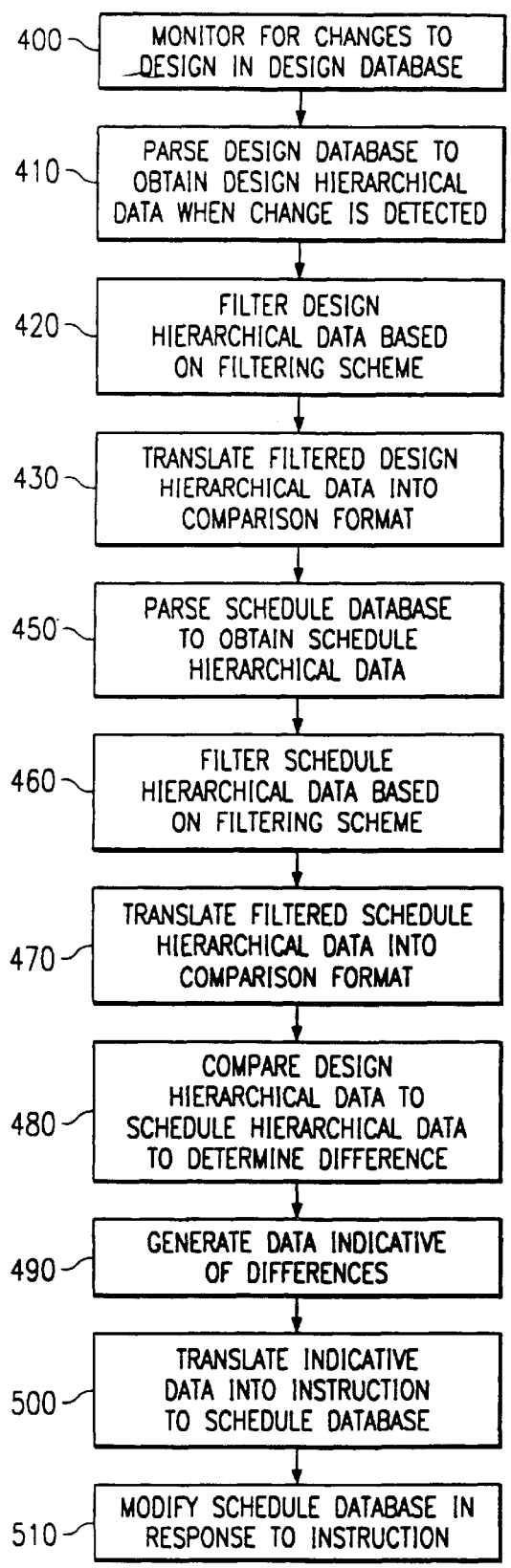
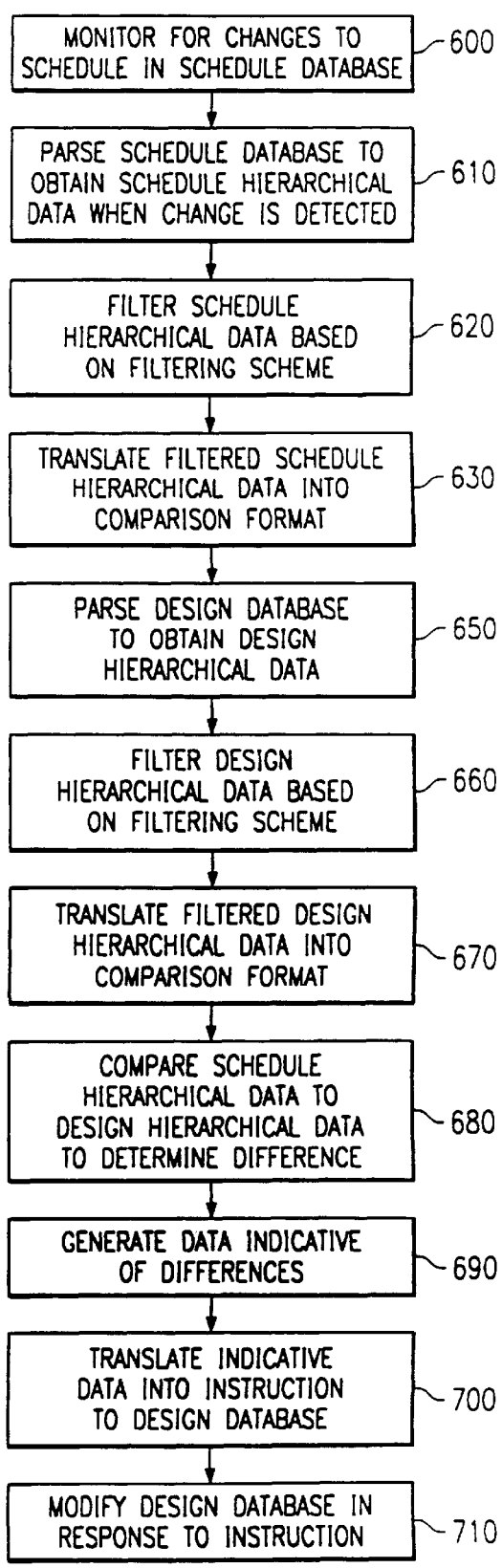

SYSTEM AND METHOD FOR INTEGRATING SCHEDULE AND DESIGN ENVIRONMENTS

This application claims benefit to Provisional Application Serial No. 60/108,381 filed Nov. 13, 1998.

TECHNICAL FIELD OF THE INVENTION

The invention relates in general to the field of engineering design and more particularly to a system and method for integrating scheduling and design environments.

BACKGROUND OF THE INVENTION

Many tools exist today that allow for the management of a design database which is used to store circuit, semiconductor, and other hardware and software design documentation. Many conventional software tools also exist for planning and scheduling the tasks to be conducted in a particular project. Both such types of tools are effective if used as "stand-alone" tools. However, a design environment is a "team-driven" environment, and therefore changes in a particular design or project schedule are effective only if the design database reflects scheduling changes, and vice versa. Using current tools, modifications made to a scheduling database are manually added in a design database. For example, a design team member may store a design in a design database. The design manager must then recognize that a change has been made, change the schedule, update the schedule database and then re-evaluate bottlenecks and deadlines within the process flow of a design or project. Changes that are undetected because of human error may set the design project back and result in missed delivery dates. This manual process is both time consuming and inexact. The error probability and the amount of time required to implement changes increases exponentially with design complexity and team size.

SUMMARY OF THE INVENTION

Accordingly, a need has arisen for a system and method of integrating scheduling and design environments. The present invention provides a system and method for integrating scheduling and design environments that addresses the shortcomings of prior systems and methods in the field of design engineering.

In one embodiment of the present invention, a system for project management integration includes a design database having design data stored in a hierarchical manner representable by design hierarchical data. The system further includes a schedule database having scheduling data stored in a hierarchical manner representable by schedule hierarchical data. The system also includes an integration module in communication with the design database and the schedule database, the integration module operable to compare the design hierarchical data and the schedule hierarchical data in response to changes to one of the design or schedule databases, the integration module further operable to change one of the design and schedule databases in response thereto.

In another embodiment of the present invention, a method of project management integration includes detecting a change to data of a first database and obtaining first hierarchical data associated with the first database in response to the detected change. The method also includes obtaining second hierarchical data associated with a second database in response to the detected change, comparing the first hierarchical data to the second hierarchical data and identifying at least one difference between the first and second of hierarchical data, and automatically generating and sending an update command to the second database automatically in response to the at least one identified difference.

In yet another embodiment of the present invention, a system for automatically updating data of a first database in response to changes made to a second database includes a first interface in communication with the first database and a second interface in communication with the second database, the second interface operable to detect changes to data in the second database. The system also includes a comparison module in communication with the first and second interface, the comparison module operable to compare first hierarchical data associated with the first database to second hierarchical data associated with the second database in response to a change detected by the second interface. The comparison module is also operable to send update data to the first interface in response to comparing the first and second hierarchical data, the first interface being operable to change the data in the first database in response to the update data.

BRIEF DESCRIPTION OF THE DRAWINGS

A more complete understanding of the invention and its advantages will be apparent from the detailed description taken in connection with the accompanying drawings in which:

FIG. 7 is a flow chart of an embodiment of a method for dynamically changing the schedule database in response to changes in the design database according to the teachings of the present invention; and FIG. 8 is a flow chart of an embodiment of a method for dynamically changing the design database in response to changes in the scheduling database according to the teachings of the present invention.

DETAILED DESCRIPTION OF THE INVENTION

Embodiments of the present invention and its advantages are best understood by referring to FIGS. 1–10 of the drawings, like numerals being used for like and corresponding parts of the various drawings.

Figure 1:
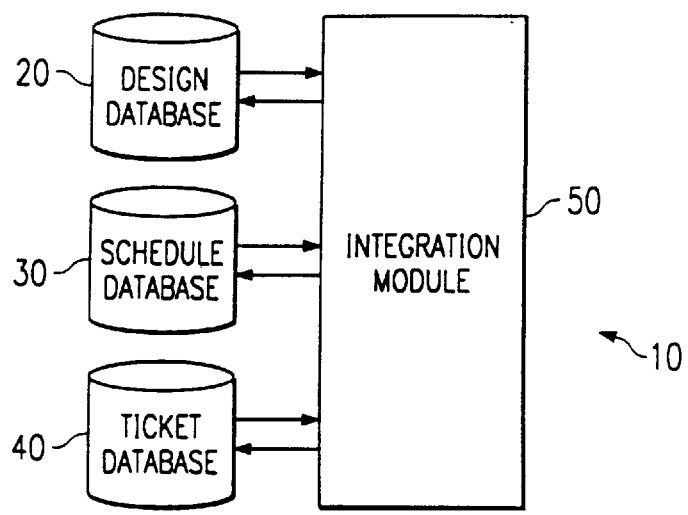
FIG. 1 is a block diagram of a system for integrating a design database and a scheduling database according to the teachings of the present invention.

FIG. 1 is a block diagram of a system 10 for automatically integrating a design database 20 with a scheduling database 30 and a ticket database 40. System 10 includes design database 20, schedule database 30 and ticket database 40, each in communication with an integration module 50. In general, changes to design database 20 or schedule database 30 are updated or synchronized in each of the remaining databases by integration module 50.

Design database 20 is a design application, module, or database operating on a server, network element, or other computing platform or device wherein design cells are graphically or textually represented. Design cells represent systems, subsystems, devices, components, elements, processes, flows or other components used in a design. Examples of a design database include Cadence's Virtuoso™, and IC Craftsmen™ products, Sagantec's Companions™, and any other design tool supporting cells, modules or work flows associated with a hierarchical structure. Although the examples given herein are related to the semiconductor industry, other design tools can be used that lay out or represent components or materials, provide a schematic for a particular system or device, or detail processes, as long as such tools use hierarchically organized cells or modules.

Design database 20 may include one or more views, perspectives or arrangements of such design cells. For example, a particular design database 20 may include a schematic view of graphical or textual representations of circuit elements or devices with communications or connections therebetween. Design database 20 may also represent a particular module or design cell in a layout view. For example, in semiconductor design databases, a layout view may include different layers of semiconductor material and insulators in their respective orientations, positions, and overlap with respect to other layers. Such a layout view is similar or equivalent to the physical layout of a device as it is manufactured. It should be understood that the schematic and layout views described herein are but two examples of views or perspectives that may be employed by a particular design database 20 and that many other suitable views can be supported within a particular design database. In particular, the design database may include purely textual information organized, classified, and indexed in a variety of formats.

Design database includes design cells that are organized in a hierarchical manner. For example, a design database may contain a particular module for a design that is being developed. Within that one particular module are expandable modules representing various systems being integrated as part of the design. Included within each system module are other modules representing subsystems. Subsystem modules may further contain particular components, devices or elements. In such a case, the overall design module is hierarchically related to modules that represent systems, subsystems and components. Therefore, each module may be expanded or drilled down to one or more modules occupying a lower level in the hierarchy to reveal additional design details. An example of modules organized and related to one another according to a hierarchial tree structure is shown below.

DESIGN ONE
  SYSTEM ONE
    SUBSYSTEM ONE
    Comparator
    MEMORY MODULES
    AMPLIFIER
    SUBSYSTEM TWO
      Register A
      Register B
      INTERFACE CIRCUIT
    Microprocessor
  SYSTEM TWO
    Microprocessor
    Memory Array
  SYSTEM THREE
    USER INTERFACE
    Monitor
    Keyboard
    Pointing Device In the example, the modules identified in capital letters are expandable modules and may correspond to components being developed by the design team. The modules identified in lower case letters may be standard elements, library components, or other devices developed or in existence prior to the current design.

Schedule database 30 may be a scheduling application, module, or database operating on a server, network element, or other computing platform or device that is capable of allowing a project manager or other user to enter, assign, and track project tasks over a project term. Schedule database 30 may provide the capability of entering data associated with each task or sub-task such as personnel or project groups assigned to task completion, resources, facilities and/or processing time associated with a particular task or sub-task, as well as initiation dates, completion dates, and/or durations for each task and sub-task. Schedule database 30 preferably has a graphical user interface so that a project manager or other user can easily view and evaluate the status of project tasks and sub-tasks. Schedule database 30 may be, for example, a database using an application such as Microsoft Project™, Scitor's Project Scheduler™, or Soft Key's Project Manager™.

Schedule database 30 may further provide the capability of arranging project tasks and sub-tasks in a hierarchical structure linking or showing relationships between such tasks and sub-tasks similar to the tree structure illustrated above in reference to design database 20. For example, a design project may have a timeline allocated for project completion, a timeline for each main task to be performed under such project and timelines for sub-tasks under each task that may be yet further broken down. Moreover, for a particular design in which both design database 20 and schedule database 30 are used, it can be seen that the hierarchy of tasks of schedule database 30 can be synchronized with the hierarchy of modules that embody design cells in design database 20. For example, the particular tasks and sub-tasks of schedule database 30 may each correspond to a design module for a particular, system, subsystem, device, or other design element. Sub-tasks for a particular system will be hierarchically related to the overall system task just as subsystem modules are hierarchically related to the system itself. Notably, design cells such as those that are not represented by capital letters in the tree structure illustrated above in reference to design database 20 will not have corresponding tasks or sub-tasks in schedule database. As described above, such design cells are standard elements, library components, or other previously developed components and are not cells containing items whose development is an active part of the design project.

Ticket database 40 may be any application, tool, routine, or database running on a server, network element, or other computing platform or device that is capable of storing and displaying particular ticket items, action items, or other events or elements assigned within a particular task or sub-task in a project. Ticket database 40 is used by a member of a project or design team, or other user, to maintain, keep track of, or provide notice of specific items that the member or user is assigned or must complete as part of a task or sub-task in a design process or other project timeline. For example, ticket items may include testing to be performed, appraisals to be written, quality assurance to be performed, meetings to be conducted or attended, data to be collected, or any other event or milestone needing to be achieved.

Ticket database 40 may be particular proprietary software developed for a particular company or may utilize any existing commercial databases, organizer applications, or personal planning software packages.

Just as in design database 20 and schedule database 30, ticket database 40 contains ticket items that are organized according to an organization hierarchy. Ticket items in particular are organized within ticket database 40 by the tasks or sub-tasks in a project to which they correspond. For example, one general task may be the design of module 1. Ticket items associated with the design of module 1 may include submitting design specifications, preparing a report based on design failures, testing a design component in a specific facility at a specific time, or any other specific items requiring action by a team member. All of these ticket items are arranged and hierarchically related relative to the general task. If the general task has sub-tasks, other ticket items may be specific to those sub-tasks.

Integration module 50 is any combination of software and hardware that is capable of interfacing and communicating with design database 20, schedule database 30, and ticket database 40. As such, integration module 50 includes at least one processing component, memory, software applications and direct or indirect connectivity with databases 20, 30 and 40. Alternatively, integration module 50 may be a combination of hardware and software that is only capable of interfacing and communicating with design database 20 and schedule database 30. Such an integration module could be used during a design or other project in which a ticket database is not desired or does is not require interaction with design database 20 or schedule database 30. In yet another alternative, a specific integration module 50 may only interact with schedule database 30 and ticket database 40. In such an embodiment, ticket and other action items respond to changes made in schedule database 30. However, in such an embodiment, design database 20 is a separate tool that does not interface with schedule database 30 or ticket database 40.

Integration module 50 includes software to monitor for and translate changes made to data in design database 20 or schedule database 30 and to determine whether or not such changes need to be reflected in any or both of the remaining databases. If a change does need to be reflected in one of the other databases, integration module 50 translates the hierarchical change in one database into an instruction that can be interpreted by the target database wherein such change is to be reflected. The instruction generated by integration module 50 in turn modifies the target database to reflect the change. Alternatively, the instruction generated by integration module 50 may merely provide an indication to a project manager, project member, or other user later accessing the target database that a change in that particular database is required. Such a request would indicate the change needed and any additional data relative to the change or entry thereof into the target database. As such, the hardware and software making up integration module 50 must provide monitoring, translation and instruction generating capabilities.

Figure 2:
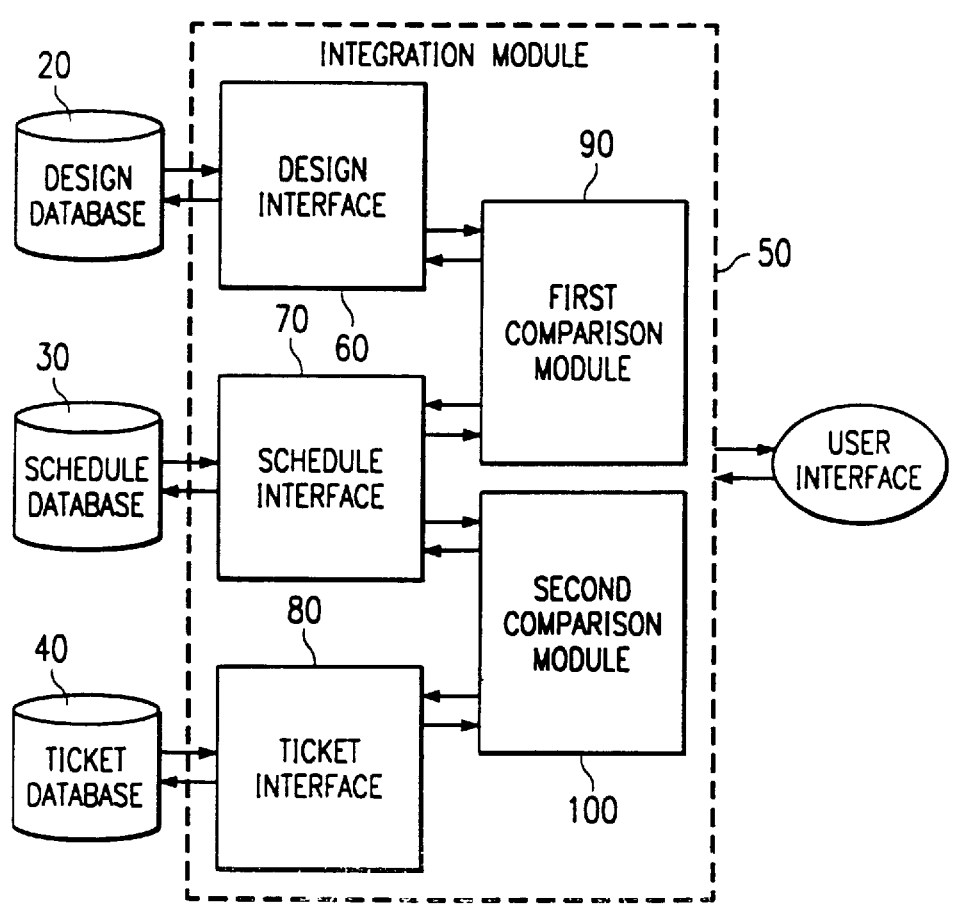
FIG. 2 is a functional block diagram of an embodiment of the system of the present invention.
Figure 3:
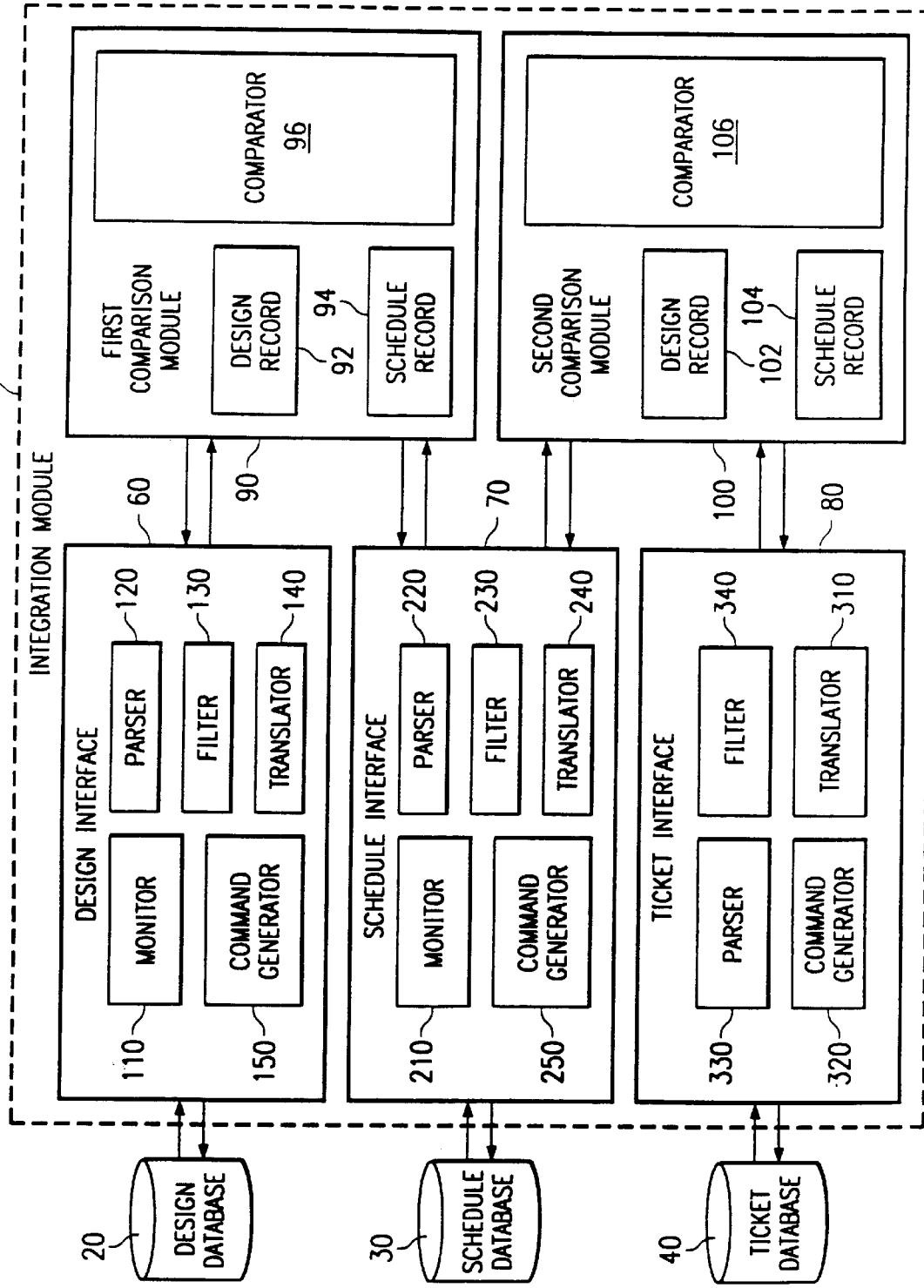
FIG. 3 is a more detailed functional block diagram of an embodiment of an integration module.

Integration module 50 will be described in greater functional detail hereinafter by referring to FIGS. 2 and 3. It is understood, however, that FIGS. 2 and 3, and the accompanying description, illustrate functional details of integration module 50 that may or may not correspond to exact structural components. Therefore, the sub-elements of integration module 50 will be differentiated and described based on function. Any or all of such sub-elements can be embodied structurally by one or more processors communicating with databases 20, 30 and 40, accessing allocated memory, and referencing and executing software applications. FIGS. 2 and 3 are intended only to convey the functionality of integration module 50 and not to limit this invention to artificial requirements as to how the software and/or hardware components should be partitioned.

In operation, system 10 is an inter-related environment for project design, scheduling and management. From a design standpoint, integration module 50 takes changes that are made to the data organized in the hierarchical structure of design database 20, such as new design elements, cells, testing, or other processes, and automatically updates or provides notification to schedule database 30 and ticket database 40. From the scheduling side, system 10 responds to changes in schedule database 30, such as new tasks, new sub-tasks or changes in the organization of such tasks by updating or notifying design database 20 or ticket database 40 based on those scheduling changes. Changes made on the ticketing side are usually either specific to the particular user changing ticket database 40 or unrelated to the scheduling of tasks or contents of design cells of schedule database 30 and design database 20 respectively, and are therefore not generally reflected in design database 20 and schedule database 30. However, system 10 may be easily adapted to recognize, translate, and reflect changes to ticket database 40 for the purpose of updating design database 20 and schedule database 30.

FIG. 2 is a more detailed functional block diagram of system 10 that shows the specific functional interfaces and comparison modules that make up integration module 50. Integration module 50 includes a design interface 60, a schedule interface 70, a ticket interface 80, a first comparison module 90, and a second comparison module 100. Design database 20 communicates with first comparison module 90 through design interface 60. Schedule database 30 communicates with first comparison module 90 and second comparison module 100 through schedule interface 70. Ticket database 40 likewise communicates with second comparison module 100 through ticket interface 80.

In general, interfaces 60, 70 and 80 monitor for changes to data in a respective database, and pass along hierarchical data associated with a changed database to one of modules 90 and 100 in response to a change. Module 90 or Module 100 then compares that hierarchical data to hierarchical data associated with one of the remaining unchanged databases, determines what modifications need to be made to data in the unchanged database in order to synchronize the two sets of hierarchical data, and initiates such modifications. The modification or database synchronization may be achieved by generating an instruction related to the change made and sending this instruction to one or both remaining databases.

Hierarchical data is a set, table, array, record or other organization of data that represents the identity of data using an identifier, and further represents the position of data units within databases 20, 30 and 40. For example, the tree structure described above is one format of such hierarchical data. As the hierarchical data associated with a particular database describes the identification and position of design cells, schedule tasks, or ticket items in the hierarchical structure of that database, synchronizing such hierarchical data associated with databases 20, 30 and 40 ensures that, for example, all design cells relevant to design project management correspond to schedule tasks in both name and position. Thus, if a new design cell is added in a particular position in the design hierarchy a new task or sub-task is created in a corresponding position in a schedule by integration module 50.

Interfaces 60, 70 and 80 are elements of integration module 50 that include any combination of hardware and software capable of monitoring changes to design database 20, schedule database 30, and ticket database 40 respectively, and further capable of communicating with such databases in order to obtain hierarchical data from such databases and send instructions to such databases. As such, interfaces 60, 70 and 80 communicate with databases 20, 30 and 40 across a data bus, public or private network, or other link or connection. As discussed, interfaces 60, 70 and 80 monitor databases 20, 30 and 40 respectively. Additionally, interfaces 60, 70 and 80 parse, receive, filter and translate data from databases 20, 30 and 40 for communication to first and second comparison modules 90 and 100. Interfaces 60, 70 and 80 also generate instructions to databases 20, 30 and 40.

First comparison module 90 includes one or more routines, applications, or sub-modules in communication with design interface 60 and schedule interface 70 that are capable of receiving hierarchical data associated with design database 20 and schedule database 30 in response to a change to one of databases 20 and 30, comparing the received hierarchical data from each of databases 20 and 30, and identifying differences between the two sets of hierarchical data. First comparison module 90 also includes further routines operable to forward such identified differences to the interface of the unchanged database. Second comparison module 100 also has routines, applications or sub-modules that are in communication with schedule interface 70 and ticket interface 80 and that are similarly operable to receive, compare, and identify differences in hierarchical data associated with design database 20 and schedule database 30.

Integration module 50 also includes a user interface whereby a user can modify integration module 50 to, for example, impose a filtering scheme on interfaces 60, 70 and 80. An administrator to integration module 50 can filter out specific modules of or changes to data design database 20, schedule database 30 or ticket database 40. For example, a user may indicate via user interface that integration module 50 should not reflect changes to layout views within a design database 20, and only reflect schematic views of that design database 20. Similarly, the administrator may impose filters within schedule interface 70 such that only changes to main project tasks that are made with schedule database 30, and not changes to specific or designated sub-tasks within schedule database 30, will be reflected in the remainder of the databases. A user accessing integration module 50 through a user interface may also direct that changes from design database 20 only be reflected in schedule database 30 and not ticket database 40. Similarly, a user may indicate through the user interface to integration module 50 that changes to schedule database 30 should only be reflected in ticket database 40 and not in design database 20. Other similar filters or directives may be imposed by user on integration module 50 through the user interface. Thus, a user may utilize the user interface to change the performance of integration module 50 relative to specific projects or assigns.

FIG. 3 is a more detailed functional diagram of integration module 50. Each of design interface 60, schedule interface 70, and ticket interface 80, and each of first and second comparison modules 90 and 100 are shown in greater functional detail with specific functions being explained with regard to specific elements. As discussed, the particular elements utilized in FIG. 3 in no way limit this invention to the particular functional blocks shown or to specific structure. For example, one software module may perform only part of the functionality of design interface 60 and may perform different parts of the functionality of first comparator module 90 and schedule interface 70. Other functions of all three components may be performed by yet another software module. In the alternative, all functionality of integration module 50 may be performed by a single processor accessing data from a single memory.

Design interface 60 includes a monitor 110 in communication with design database 20 and a parser 120. A filter 130 is also in communication with parser 120 and additionally with a translator 140. Translator 140 is in communication with first comparison module 90 and a command generator 150. Command generator 150 is also in communication with design database 20. Elements of design interface 60 such as monitor 110, parser 120, filter 130, translator 140, and command generator 150 may be routines or software processes performed by one or more processing devices.

Monitor 110 monitors for and detects changes to design data of design database 20. Monitor 110 may monitor for such changes using a particular polling routine or technique or may monitor for such changes by waiting for interrupts generated by design database 20 to design interface 60. When monitor 110 identifies that a change has been made to design database 20, monitor 110 communicates the existence of such change to parser 120.

Parser 120 interrogates or otherwise reviews the design data of design database 20 to generate hierarchical data representative of the arrangement of design cells within design database 20. Parser generates hierarchical data by noting the relative position and structure of each design cell in design database 20. For example, a particular design cell expandable from a module within the design cell for a larger system, such particular design cell expanding to show three smaller modules, would have hierarchical data noting the identity of the particular design cell, the relationship of the particular design cell to that of the larger system, and the relationship of the particular design cell to each of the three smaller modules. In such a way parser 120 can build a complete set of hierarchical data showing the identity and relative position of all design cells in a particular design.

Parser 120 also responds to requests from first comparator module 90 to generate the hierarchical data representative of the arrangement of design cells within design database 20 that can be sent to first comparison module 90 to identify the differences between the design hierarchical data and schedule hierarchical data associated with schedule database 30 after a change has been made to schedule database 30. The generated hierarchical data will be filtered and translated by filter 130 and translator 140 as described below before being sent to first comparator module.

Filter 130 filters, once parser 120 has generated the hierarchical data, the hierarchical data in order to generate a resultant hierarchical data that requires synchronization with schedule hierarchial data of schedule database 30. Such filters, as discussed in FIG. 2, may include commands filtering out hierarchical data related to particular views within design database 20, certain elements within a particular module, or particular levels of design cells not be synchronized with schedule database 30. For example, design database 20 may include a module that contains sub-modules which are to be designed during the course of the design project and other sub-modules that were previously designed or that are standard templates used to represent standard electrical components. In one particular filtering scheme, only those modules that are to be designed in this particular design project are to be synchronized in the databases. It may be possible that changes to design data in design database 20 do not change the design hierarchical data, it is also possible that changes may occur only to those portions of the hierarchical data that are filtered out by filter 130. Thus, design interface may send hierarchical data to first comparator module 90 that is unchanged relative to what the hierarchical data would have been before a data change to design database 20.

Translator 140 translates the filtered hierarchical data into a common comparison format that can be easily compared to similarly filtered hierarchical data associated with schedule database 30. For example, design interface 60, having generated hierarchical data detailing the position of a "system 1 design cell" may translate the identity of the cell into the identifier "system 1" and translate the position and relation of the cell into a list following the identifier wherein other cells that define the position of system 1 are identified by an identifier and an indicator of relation to system 1.

Translator 140 also receives data from first comparison module 90 in order to change design data in design database 20 to synchronize the hierarchical data associated with design database 20 with the hierarchical data associated with schedule database 30. Translator 140 receives update data from first comparison module 90 and translates such data into a format specific to design interface 60. For example, translator 140 will re-identify names obtained from schedule database 30 to correspond with new design cells in design database 20. In such a way, a "subsystem 2 task" is added to schedule database 30, is sent to design interface 60 as "subsystem 2," and will be re-identified by design interface 60 as "subsystem 2 design cell." Similar translation may be done to positional data indicative of where in a particular design "subsystem 2 design cell" needs to be added. Such an example indicates that it is highly desirable for design team members to utilize a naming convention for design components.

Command generator 150 generates and sends an update command, such as a macro, instruction or other command, to design database 20 that is operable to change the data in design database 20 to, for example, create, change the position of, or delete a design cell in response to the translated update data. The update command may be operable to implement the change on its own within design database 20, or may merely cause a visual indication to be displayed to a user of design database 20, or a specific designated user of design database 20, that provides such user with details sufficient to implement the change in design database 20.

Command generator 150 may also generate an update command to cause design database 20 to create a template for a new design cell. The update command may cause design database 20 to fill in some parts of the template in response to the translated update data. For example, the update command may direct that design database 20 designate the name of the design cell and the module in which the new design cell will reside in response to the translated update data. Other data fields of the template may, for example, be filled in with default data related to the graphic symbol used to represent the design cell, the size and position of the design cell in a particular view, and the default connections or contact points to the design cell. Such default data may be filled in as a result of an update command generated in response to user-defined data that is entered by a user of integration module 50 via user-interface and stored in integration module 50. Thus, the update command may have parameters established in response to user-defined data entered by a user via the user-interface of integration module 50. Such parameters may be conditional parameters dependent on the type of change in design database 20 or further dependent on naming conventions established by the user.

The command update may generate an update command operable to add a template in design database 20 for a design cell having characteristics based on the user defined data and the identity of a task or sub-task that has been added to schedule database 30. If, for example, the identity of a task is "memory x," command generator may access the user-defined data and, in response thereto, generate an update command operable to cause design database 20 to generate or select two templates, one for a particular design cell in a schematic view and one for a corresponding design cell in a layout view. The update command may select size, orientation, materials, specific graphical objects or other default parameters to be used in creating a template and/or may select a previously defined template from a library of such templates stored in design database 20. Alternatively, an added task entitled "system x" may only cause one design cell for "system x" to be created in a schematic view having entirely different characteristics in response to the same set user-defined data. Different sets of user-defined data and naming conventions can be used for different design projects within the same integration module 50. It can be easily seen that a user can access integration module 50 via user interface to completely customize the automated update environment for a particular design project.

Schedule interface 70 includes a monitor 210 in communication with schedule database 30 and a parser 220. A filter 230 is also in communication with parser 220 and additionally with a translator 140. Translator 240 is in communication with first comparison module 90, second comparison module 100, and a command generator 250. Command generator 250 is also in communication with schedule database 30. Elements of schedule interface 70 such as monitor 110, parser 120, filter 130, translator 140, and command generator 150 may all be routines or software processes performed by a single processing device.

Each of the elements of schedule interface 70 perform in an equivalent manner to each of the elements of design interface 60 with a few exceptions. Schedule interface 70 communicates directly with schedule database 30 instead of design database 20. Thus, references to design cells in the description of design interface 60 instead relate to design tasks or sub-tasks, and references to position of design cells instead relate to the relationship between tasks and sub-tasks. Schedule interface 70 also communicates with both first comparison module 90 and second comparison module 100. Thus, when changes to schedule database 30 occur, hierarchical data is sent to both first comparison module 90 and second comparison module 100 to compare the hierarchical data to hierarchical data associated with both design database 20 and ticket database 30 and eventually cause changes within both of those databases.

Additionally, after receiving update data from first comparison module 90 in response to a change in design database 20, schedule interface 70, after changing schedule database 30, will then respond as if a new change has been made to schedule database 30 that is independent of changes to design database 20. As a result, schedule interface 70 will parse, filter and translate hierarchical data and send it to second comparison module 100 so that ticket database 40 can also be updated based on the original change to design database 20.

Other differences relate to the actions of command generator 250. A command, macro, or other instruction generated by schedule interface 70 may create a task template for schedule database 30 similar to the template described in reference to command generator 150. However, the default data entered into the template as a result of the command, macro or other instruction may include such data as, for example, having a default team member assigned as a responsible party or assigning a default task duration, start date, and termination date.

Ticket interface 70 includes a parser 330 in communication with ticket database 30 and a filter 340 in communication with parser 330 and with a translator 310. Translator 310 is in communication with second comparison module 100 and a command generator 320. Command generator 320 is also in communication with ticket database 30. Elements of ticket interface 70 such as parser 330, filter 340, translator 310, and command generator 320 may all be routines or software processes performed by a single processing device.

As discussed earlier, changes within ticket database 40 are generally highly specific and individual in nature and generally do not require corresponding changes in design database 20 or schedule database 30. However, ticket interface 80 may still respond to changes to design database 20 and schedule database 30. Thus, ticket interface 80 awaits an indication by second comparison module 100 that a change has been detected in schedule database 30. Once such a change has been so indicated, parser 330 within ticket interface 80 parses ticket database 40 to generate hierarchical data associated with ticket database 40. Filter 340 applies filters similar to those employed in design interface 60 such that the resulting filtered hierarchical data only includes those ticket or action items related to tasks and sub-tasks that are to correspond to schedule database 30. Translator 310 then translates the resulting filtered hierarchical data into a comparison format that can be easily compared by second comparison module 100. As a result of such comparison, ticket interface 80 may receive update data from second comparison module 100. Translator 310 then translates such update data into a format specific to ticket interface. Command generator 320 generates a command, macro or other instruction to change ticket database 40 or to indicate that a change to ticket database 40 should be made by a user. As with other interfaces, ticket interface 80 may create a template of ticket or action items for ticket database 40 that may have defaults assigned or that may respond to a naming convention of tasks and sub-task within schedule database 30 in order to customize a template of action items depending on the type of task involved.

First comparison module 90 includes a design record 92 and a schedule record 94, each accessible by a comparator 96. First comparison module 90 communicates with design interface 60 and schedule interface 70 and, in particular, requests and obtains hierarchical data from both design interface 60 and schedule interface 70 when a change is detected to either design database 20 or schedule database 30. Generally, first comparison module 90 responds to a change in design database 20 or schedule database 30 by comparing design record 92 to schedule record 94 based on hierarchical data associated with design database 20 that is stored in design record 92 and hierarchical data associated with schedule database 30 that is stored in schedule record 94. Then, first comparison module 90 identifies any differences between design record 92 and schedule record 94 and sends update data reflecting those differences to the database that did not originally change.

Design record 92 and schedule record 94 are memory structures, arrays, records, registers, queues or other memory arrangements wherein hierarchical data from both interfaces 60 and 70 is stored in corresponding fields of their respective record. Design record 92 and schedule record 94 thus allow comparator 96 to easily isolate and identify difference between the two sets of hierarchical data.

Comparator 96 can be any routine, application, or macro operable to compare fields of design record 92 and schedule record 94 to identify differences in the hierarchical data stored in each record. For example, comparator 96 may utilize a character scanning routine, diff function, ASCII value comparison, or other means of determining differences in fields of the two records 92 and 94. Once comparator 96 has identified a difference, comparator 96 extracts a field in the hierarchical data that contains the difference in the record corresponding to the original change in the database. That field is then sent to the interface 60 or 70 that corresponds to the database that did not receive the original change. In that way differences between the hierarchical data associated with the two databases 20 and 30 as a result of a change to one database 20 or 30 are resolved by modifying or updating the unchanged database. The end result is synchronized hierarchical data for the two databases 20 and 30.

Alternatively, the most recent versions of hierarchical data for each of databases 20 and 30 may be maintained by first comparison module 90 in design record 92 and schedule database 94. In that manner, only hierarchical data associated with the changed database needs to be sent to first comparison module 90 as the current hierarchical data of the other database should be already on file in one of records 92 or 94.

Both first and second comparison module 90 and 100 behave similarly, each interacting with a different set of two interfaces. Alternatively, only one comparison module may interact with all three interfaces as long as hierarchical data from all three interfaces are in a common comparison format or translatable and recognizable by the comparison module. Although only first comparison module 90 is described in detail, it is understood that, other than second comparison module 100 communicating with schedule interface 70 and ticket interface 80, second comparison module 100 and its components may be functionally equivalent to first comparison module 90.

Figure 4:
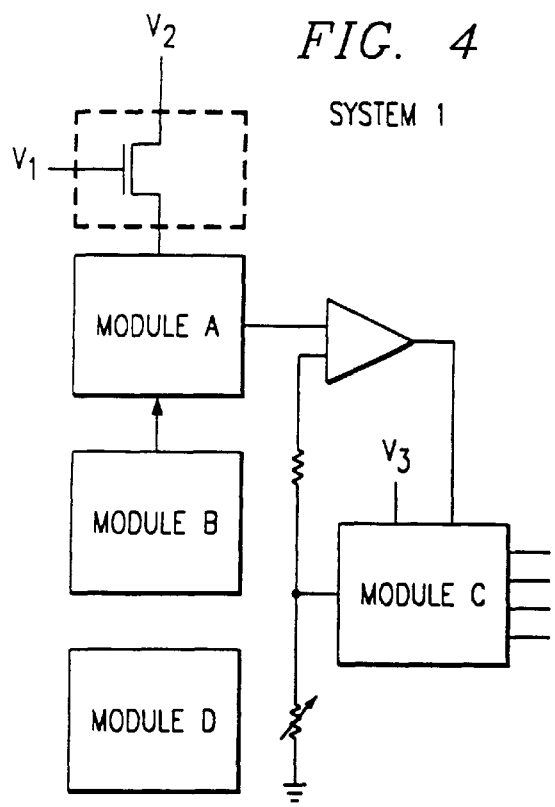
FIG. 4 is a schematic view of a particular design module within the design database.

FIG. 4 is a diagram of the schematic view of a particular design module within design database 20. This schematic view includes modules A, B, C and D, as well as other circuit elements, inputs and signals that are not identified as design modules. Modules A, B and C are shown connected to each other and other non-module elements to represent the complete design of system 1. Module D, although presented in the view, does not show any connections to modules A, B and C. or other elements of system 1. Thus, by looking at the graphical view, one is given an indication that a module D exists but not how module D should be connected to or otherwise relates to the rest of system 1. Such a result is an example of how a change made to, for example, schedule database 30 may be reflected within a particular view of design database 20.

For example, module D may correspond to an added sub-task D under the task of system 1 within schedule database 30. Integration module 50 communicates the addition of D in schedule database 30 using interfaces 60 and 70 to forward the change to design database 20. Although no details are communicated regarding module D's connection to or communication with other modules of system 1, the hierarchical data communicated by integration module 50 to design database 20 does indicate that module D has been added as a sub-module of system 1. Thus, integration module 50 causes an instruction to be generated by design interface 50 such that a template for module D is generated by design database 20 and placed in its proper hierarchical position within the module of system 1. The template is a temporary or dummy module of module D that includes both know and assumed characteristics of module D. The next time a design user, or particular designated design user, accesses this particular schematic view of system 1 such user will be notified by the presence of the template for module D that a change has been made to schedule database 30 that requires integration and synchronization with existing elements of system 1.

Figure 5:
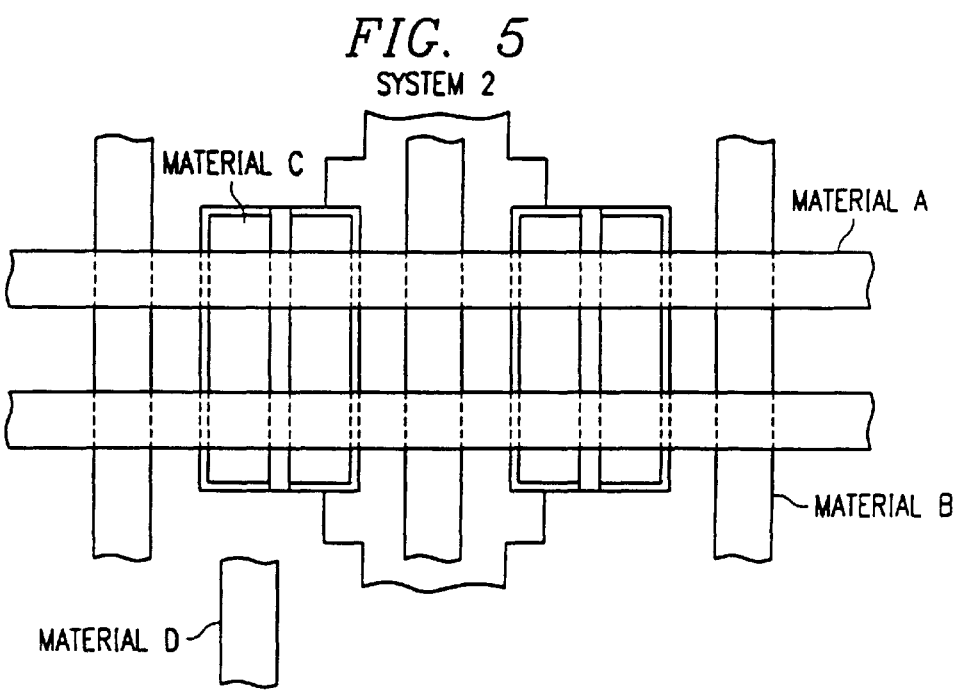
FIG. 5 is a layout view of a particular design module within the design database.

FIG. 5 is a diagram of the layout view of a particular design module within the design database. In particular, FIG. 5 illustrates a layout view of the design of a particular integrated circuit identified as System 2. As discussed in reference to FIG. 4, when changes are made to a particular task or sub-task within schedule database 30, such change can be reflected within the layout view of a particular device within design database 20 by the mere addition of a template for the material or device corresponding to the added sub-task. In this case, material D is shown within the layout view of system 2 but is not shown in its correct position, orientation, or relation to other materials. Again, the insertion of a template for material D notifies a user accessing this particular layout view of system 2 that new material D needs to be added for integration and synchronization with existing elements of system 2. It should be understood that, although adding material to a layout view of a design in design database 30 is discussed, Material D, as used herein, may be a template describing a combination of one or more materials, or even a cell including a layout view of an entire device or device element.

Figure 6:
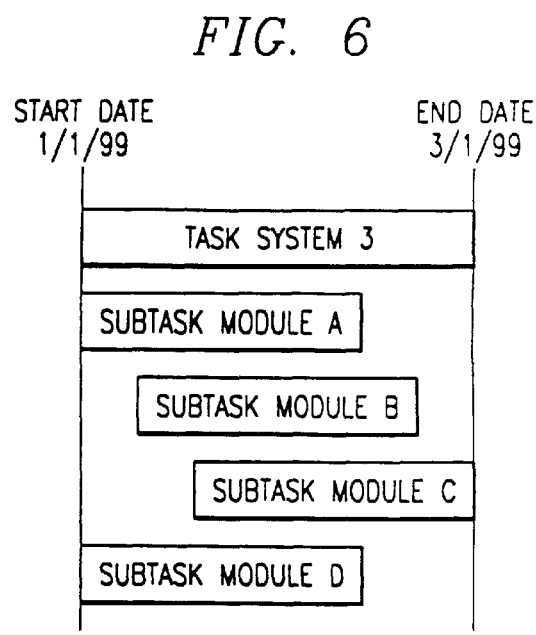
FIG. 6 is a scheduling view of a particular design schedule in the schedule database.

FIG. 6 is a diagram of the scheduling view of a particular project schedule within the schedule database. In particular, FIG. 6 is a diagram illustrating tasks and sub-tasks associated with the design of a system 3. The design of system 3 has a particular start date and end design date as shown. Sub-tasks related to modules A, B and C are also shown within the allocated timeline of the task related to system 3. A sub-task related to module D is also shown within the same timeline. Such sub task may be created as a template by schedule interface 70 in response to the addition of a module D in design database 20. Module D may have an indication, whether by color, unassigned date, or other indication such that a user of schedule database 30 can recognize that a sub-task associated with module D needs to be assigned a proper relationship and position within the scheduling view for system 3 on schedule database 30.

As discussed above in reference to FIGS. 4 and 5, a change made to design database 20 may not present sufficient data for integration module 50 to communicate to schedule database 30 complete scheduling parameters. Thus, the presence of the sub-task template representing a sub-task associated with module D is shown in the schedule to give the user an indication that the new sub-task has yet to be integrated within the schedule of system 3.

FIG. 7 is a flowchart of a method for automatically changing schedule database 30 in response to changes in design database 20. In step 400, integration module 50 monitors for changes to design data in design database 20. In step 410, integration module 50 parses design database 20 to generate design hierarchical data, representative of the position in which design data is arranged in the hierarchy of design database, in response to integration module 50 detecting a change to the design data. Then, in step 420, integration module 50 filters the design hierarchial data based on a filtering scheme imposed by integration module 50. In step 430, integration module 50 translates the filtered design hierarchical data into a predetermined format for comparison by integration module 50. In step 450, integration module 50 parses scheduling data in schedule database 30 to extract schedule hierarchical data. In step 460, integration module 50 filters the schedule hierarchical data based on the filtering scheme imposed by integration module 50. Next in step 470, integration module 50 translates the filtered schedule hierarchical data into a format for comparison by integration module 50. In step 480, integration module 50 compares the schedule hierarchical data to the design hierarchical data to determine at least one difference between the two sets of hierarchical data associated with design database 20 and schedule database 30. Then, in step 490, integration module 50 generates update data that is indicative of the difference or differences determined in step 480. In step 500, integration module 50 translates this update data into an instruction capable of automatically updating the scheduling data in schedule database 30 so that the schedule hierarchical data associated with schedule database 30 is synchronized with the hierarchical data associated with design database 20. Thus, in step 510, schedule database 30 responds to the instruction of step 500 to modify schedule database 30 in order to change scheduling data and/or to generate notification to a user of schedule database 30 that changes need to be implemented to reflect changes that have occurred in design database 20.

FIG. 8 is a flowchart of a method for automatically changing design database 30 in response to changes in schedule database 20. In step 600, integration module 50 monitors for changes to schedule data in schedule database 20. In step 610, integration module 50 parses schedule database 20 to generate schedule hierarchical data, representative of the position in which schedule data is arranged in the hierarchy of schedule database, in response to integration module 50 detecting a change to the schedule data. Then, in step 620, integration module 50 filters the schedule representative of the hierarchial data based on a filtering scheme imposed by integration module 50. In step 630, integration module 50 translates the filtered schedule hierarchial data into a format for comparison by integration module 50. In step 650, integration module 50 parses design data in design database 30 to extract design hierarchical data. In step 660, integration module 50 filters the design hierarchical data based on the filtering scheme imposed by integration module 50. Next, in step 670, integration module 50 translates the filtered design hierarchical data into the predetermined format for comparison by integration module 50. In step 680, integration module 50 compares the design hierarchical data to the schedule hierarchical data to determine at least one difference between the two sets of hierarchical data. Then, in step 690, integration module 50 generates update data that is indicative of the difference or differences determined in step 680. In step 700, integration module 50 translates this update data into an instruction capable of automatically updating the design data in design database 30 such that hierarchical data associated with design database 30 is synchronized with hierarchical data associated with schedule database 20. Thus, in step 710, design database 30 responds to the instruction of step 700 to modify design database 30 in order to change design data and/or to generate notification to a user of design database 30 that changes need to be implemented to reflect changes that have occurred in schedule database 20.

Although the present invention and its advantages have been described in detail, it should be understood that various changes, substitutions, and alterations can be made therein without departing from the spirit and scope of the invention as defined by the appended claims.

What is claimed is:

1. A system for project management integration, the system comprising:
   a design database having design data stored in a hierarchical manner representable by design hierarchical data;
   a schedule database having scheduling data stored in a hierarchical manner representable by schedule hierarchical data; and
   an integration module in communication with the design database and the schedule database, the integration module operable to compare the design hierarchical data and the schedule hierarchical data in response to changes to one of the design and schedule databases, the integration module further operable to change one of the design and schedule databases in response to the comparison, the integration module includes a filter operable to filter hierarchical data in response to a filtering scheme.

2. The system of claim 1, further comprising a ticket database having action items stored in a hierarchical manner representable by ticket hierarchical data, the integration module operable to compare the schedule hierarchical data to the ticket hierarchical data in response to changes to the scheduling data, the integration module operable to change the action items in response to comparing the schedule hierarchical data to the ticket hierarchical data.

3. The system of claim 1, wherein the integration module includes a monitor in communication with one of the design and schedule databases, the monitor operable to detect changes to the data therein.

4. The system of claim 1, wherein the integration module includes a parser operable to parse data of one of the design and schedule databases to generate hierarchical data associated therewith.

5. The system of claim 1, wherein the filtering scheme includes commands filtering hierarchical data related to predetermined views within the design database.

6. The system of claim 1, wherein the integration module comprises:
   a design record operable to store the design hierarchical data;
   a schedule record operable to store the schedule hierarchical data; and
   a comparator operable to compare the design record and the schedule record, the comparator operable to change the data of one of the design and schedule databases in response to comparing the design record and the schedule record.

7. The system of claim 1, wherein the integration module comprises:
   a design record operable to store the design hierarchical data;
   a schedule record operable to store the schedule hierarchical data;
   a comparator operable to compare the design record and the schedule record; and
   a command generator operable to send an update command to the schedule database in response to the comparator comparing the design record and the schedule record.

8. The system of claim 1, wherein the filtering scheme includes commands filtering predetermined elements within a specified design.

9. The system of claim 1, wherein the filtering scheme includes commands filtering predetermined levels of design cells from the design data that will not be compared with the schedule database.

10. A system for automatically updating data of a first database in response to changes made to a second database, the system comprising:
    a first interface in communication with the first database;
    a second interface in communication with the second database, the second interface operable to detect changes to data in the second database; and
    a comparison module in communication with the first and second interface, the comparison module operable to compare first hierarchical data associated with the first database to second hierarchical data associated with the second database in response to a change detected by the second interface, the comparison module operable to send update data to the first interface in response to comparing the first and second hierarchical data, the first interface operable to change the data in the first database in response to the update data, the second interface includes a filter operable to filter the second hierarchical data in response to a filtering scheme.

11. The apparatus of claim 10, wherein the second database is a design database having design data and the second interface is a design interface.

12. The apparatus of claim 10, wherein the second database is a schedule database having scheduling data and the second interface is a schedule interface.

13. The apparatus of claim 10, wherein the second interface includes a parser operable to generate the second hierarchical data associated with the second database.

14. The apparatus of claim 10, wherein the filtering scheme includes commands filtering hierarchical data related to predetermined portions of the data from the first database.

15. The apparatus of claim 10, wherein the comparison module comprises:
    a first record operable to store the first hierarchical data;
    a second record operable to store the second hierarchical data; and
    a comparator operable to compare at least one field of the first record to a corresponding at least one field of the second record, the comparator sending the update data to the first interface in response comparing the fields.

16. The apparatus of claim 10, wherein the first interface includes a command generator operable to generate and send an instruction to the first database, the instruction operable to modify the data of the first database in response to the update data sent by the comparison module.

17. The system of claim 10, wherein the filtering scheme includes commands filtering predetermined portions of the data in the first database.

18. The system of claim 10, wherein the filtering scheme includes commands filtering predetermined portions of the data from the first database that will not be compared with the data from the second database.

19. A method of project management integration, the method comprising:
    detecting a change to data of a first database;
    parsing data of the first database to generate the first hierarchical data associated with the first database;
    filtering the first hierarchical data in response to a filtering scheme;
    translating the filtered first hierarchical data into a comparison format;
    obtaining second hierarchical data associated with the second database in response to the detected change;

comparing the first hierarchical data to the second hierarchical data and identifying at least one difference between the first and second of hierarchical data; and automatically generating and sending an update command to the second database in response to the at least one identified difference.

20. The method of claim 19, wherein detecting the change comprises polling the first database.

21. The method of claim 19, wherein detecting the change comprises detecting an interrupt generated by the first database.

22. The method of claim 19, wherein the filtering scheme includes commands filtering hierarchical data related to predetermined portions of the data from the first database.

23. The method of claim 19, wherein comparing the first and second hierarchical data comprises:

placing the first hierarchical data into a first record, the first record having a first set of fields;

placing the second hierarchical data into a second record, the second record having a second set of fields;

comparing at least one pair of corresponding fields of the first and second records; and identifying a difference in the at least one pair of corresponding fields.

24. The method of claim 19, wherein generating the update command comprises:

generating update data indicative of the at least one identified difference between the first and second hierarchical data; and translating the update data into the update command, the update command operable to change the data stored in the second database.

25. The method of claim 19, wherein automatically generating and sending an update command comprises:

receiving user-defined data establishing parameters of the update command;

generating the update command in response to the user defined data, the update command including instructions for changing the data in the second database, the instructions determined by the user-defined data; and sending the update command to the second database, the update command initiating data modifications to the second database.

26. The system of claim 19, wherein the filtering scheme includes commands filtering predetermined portions of the data in the first database.

27. The system of claim 19, wherein the filtering scheme includes commands filtering predetermined portions of the data from the first database that will not be compared with the data from the second database.

* * * * *